(12) United States Patent
Kakadia et al.

(10) Patent No.: US 10,349,225 B2
(45) Date of Patent: Jul. 9, 2019

(54) PRIVATE MULTICAST NETWORKS

(71) Applicant: Verizon Patent and Licensing Inc., Basking Ridge, NJ (US)

(72) Inventors: Deepak Kakadia, Union City, CA (US); Thomas H. Tan, San Jose, CA (US); Sagiv Draznin, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 422 days.

(21) Appl. No.: 14/011,298

(22) Filed: Aug. 27, 2013

(65) Prior Publication Data
US 2015/0063186 A1 Mar. 5, 2015

(51) Int. Cl.
*H04W 4/06* (2009.01)
*H04L 29/06* (2006.01)
*H04L 12/18* (2006.01)

(52) U.S. Cl.
CPC .............. *H04W 4/06* (2013.01); *H04L 12/18* (2013.01); *H04L 65/4076* (2013.01)

(58) Field of Classification Search
CPC .......... H04L 29/06; H04W 4/06; H04W 76/45
USPC ...................................................... 709/228
See application file for complete search history.

(56) References Cited

U.S. PATENT DOCUMENTS

| | | | | |
|---|---|---|---|---|
| 6,529,882 B1 * | 3/2003 | Park | .................. | G06Q 30/02 705/51 |
| 7,075,904 B1 * | 7/2006 | Manish | ............... | H04L 12/1886 370/312 |
| 7,162,241 B2 * | 1/2007 | Kim | .................. | H04W 4/08 370/260 |
| 7,170,863 B1 * | 1/2007 | Denman | ................. | H04W 4/10 370/260 |
| 7,549,160 B1 * | 6/2009 | Podar et al. | ...................... | 726/4 |
| 7,970,425 B2 * | 6/2011 | Balachandran | .......... | H04W 4/10 455/519 |
| 8,196,051 B2 * | 6/2012 | Zaner | .................. | H04L 12/1822 715/751 |
| 8,249,068 B2 * | 8/2012 | Bijwaard et al. | ............. | 370/390 |

(Continued)

OTHER PUBLICATIONS

Wikipedia, "Multicast Address", http://en.wikipedia.org/w/index.php?title=Multicast_address&oldid=569517613, Aug. 21, 2013, 6 pages.

(Continued)

*Primary Examiner* — Backhean Tiv

(57) ABSTRACT

A device is configured to receive registration information associated with a set of user devices, and to determine a group based on the registration information. The device is configured to generate a group identifier to transport a message through a network. The device is configured to determine a set of active user devices, of the set of user devices, associated with the group, and to determine a set of device identifiers associated with the set of active user devices. The device is configured to determine an association between the group identifier and the set of device identifiers, and to provide the association to a network device to cause the network device to deliver a message from a first user device, of the set of active user devices, to one or more other active user devices of the set of active user devices.

20 Claims, 10 Drawing Sheets

(56) References Cited

U.S. PATENT DOCUMENTS

| | | | | |
|---|---|---|---|---|
| 8,428,237 B1* | 4/2013 | Denman | H04W 4/10 | 379/202.01 |
| 9,246,763 B2* | 1/2016 | Forssell | H04L 41/082 | |
| 9,432,820 B2* | 8/2016 | Anchan | H04W 4/10 | |
| 9,736,705 B2* | 8/2017 | Yun | H04W 24/02 | |
| 10,182,330 B2* | 1/2019 | Pazos | H04L 65/4069 | |
| 2002/0037736 A1* | 3/2002 | Kawaguchi | H04W 4/08 | 455/518 |
| 2003/0017836 A1* | 1/2003 | Vishwanathan | H04L 29/06 | 455/517 |
| 2003/0083046 A1* | 5/2003 | Mathis | H04L 12/1818 | 455/412.1 |
| 2003/0086423 A1* | 5/2003 | Hsu | H04L 12/1886 | 370/390 |
| 2003/0119540 A1* | 6/2003 | Mathis | H04M 3/42365 | 455/518 |
| 2003/0126137 A1* | 7/2003 | McFadden | G06F 16/288 | |
| 2003/0153340 A1* | 8/2003 | Crockett | H04M 3/56 | 455/518 |
| 2003/0231629 A1* | 12/2003 | Banerjee | H04L 12/185 | 370/390 |
| 2004/0082351 A1* | 4/2004 | Westman | H04L 12/185 | 455/518 |
| 2004/0137882 A1* | 7/2004 | Forsyth | H04L 12/1822 | 455/414.1 |
| 2004/0185856 A1* | 9/2004 | McKenna | H04W 4/08 | 455/445 |
| 2004/0230664 A1* | 11/2004 | Bowers | H04L 12/1836 | 709/208 |
| 2004/0233907 A1* | 11/2004 | Hundscheidt | H04L 12/185 | 370/390 |
| 2004/0246984 A1* | 12/2004 | Hundscheidt | H04L 12/185 | 370/432 |
| 2005/0007969 A1* | 1/2005 | Hundscheidt | H04L 12/185 | 370/312 |
| 2005/0076369 A1* | 4/2005 | Cai | H04L 12/185 | 725/62 |
| 2005/0111474 A1* | 5/2005 | Kobayashi | H04L 12/185 | 370/432 |
| 2005/0143135 A1* | 6/2005 | Brems | H04M 1/2745 | 455/564 |
| 2005/0170842 A1* | 8/2005 | Chen | H04L 12/185 | 455/454 |
| 2005/0181815 A1* | 8/2005 | Shostak | H04L 12/1822 | 455/519 |
| 2005/0243721 A1* | 11/2005 | Cai | H04L 12/18 | 370/230 |
| 2005/0281264 A1* | 12/2005 | Hsu | H04L 12/185 | 370/390 |
| 2005/0281265 A1* | 12/2005 | Sakamoto | H04L 12/185 | 370/390 |
| 2006/0003784 A1* | 1/2006 | Chion | H04W 4/10 | 455/518 |
| 2006/0030347 A1* | 2/2006 | Biswaas | H04W 4/10 | 455/518 |
| 2006/0040689 A1* | 2/2006 | Yoon | H04W 76/45 | 455/518 |
| 2006/0077897 A1* | 4/2006 | Kotzin | H04L 67/06 | 370/235 |
| 2006/0088031 A1* | 4/2006 | Nalawade | H04L 12/185 | 370/390 |
| 2006/0168087 A1* | 7/2006 | Lescuyer | H04L 51/04 | 709/207 |
| 2006/0184683 A1* | 8/2006 | Bosscha et al. | 709/230 | |
| 2006/0235981 A1* | 10/2006 | Westman | H04L 12/185 | 709/227 |
| 2006/0246933 A1* | 11/2006 | Na | H04W 76/45 | 455/518 |
| 2007/0019616 A1* | 1/2007 | Rantapuska | H04L 12/1822 | 370/352 |
| 2007/0049314 A1* | 3/2007 | Balachandran | H04W 4/10 | 455/518 |
| 2007/0058653 A1* | 3/2007 | Harris | H04L 12/189 | 370/432 |
| 2007/0177593 A1* | 8/2007 | Kompella | H04L 12/18 | 370/390 |
| 2007/0233802 A1* | 10/2007 | Kulkarni | H04W 76/45 | 709/207 |
| 2007/0286106 A1* | 12/2007 | Yang | H04W 4/06 | 370/312 |
| 2008/0084837 A1* | 4/2008 | Watanabe | H04W 72/005 | 370/312 |
| 2008/0125158 A1* | 5/2008 | Shostak | H04L 12/1818 | 455/519 |
| 2008/0132181 A1* | 6/2008 | Shen | H04W 72/005 | 455/90.2 |
| 2008/0253322 A1* | 10/2008 | So | H04L 12/189 | 370/329 |
| 2008/0288589 A1* | 11/2008 | Ala-Pietila | G06Q 10/109 | 709/204 |
| 2008/0310408 A1* | 12/2008 | Thompson | G06Q 30/02 | 370/386 |
| 2009/0054097 A1* | 2/2009 | Kim | H04L 12/1822 | 455/518 |
| 2009/0190587 A1* | 7/2009 | Zhao | H04L 12/18 | 370/390 |
| 2009/0252084 A1* | 10/2009 | Fodor | H04L 12/189 | 370/328 |
| 2009/0320102 A1* | 12/2009 | Ou | H04L 51/38 | 726/4 |
| 2010/0083318 A1* | 4/2010 | Weare | G11B 27/105 | 725/46 |
| 2010/0261488 A1* | 10/2010 | Little | H04L 12/1886 | 455/466 |
| 2010/0262924 A1* | 10/2010 | Kalu | H04L 51/04 | 715/753 |
| 2010/0287215 A1* | 11/2010 | Lasensky | G06Q 10/06 | 707/805 |
| 2010/0306320 A1* | 12/2010 | Leppanen | G06Q 10/10 | 709/206 |
| 2010/0329169 A1* | 12/2010 | de Bruin | H04L 12/1886 | 370/312 |
| 2011/0069652 A1* | 3/2011 | Kakani | H04L 12/185 | 370/312 |
| 2011/0161319 A1* | 6/2011 | Chunilal | G06Q 10/00 | 707/733 |
| 2012/0151561 A1* | 6/2012 | Kreiner | H04L 12/1845 | 726/4 |
| 2012/0202428 A1* | 8/2012 | Mirbaha | H04L 12/185 | 455/41.2 |
| 2012/0232943 A1* | 9/2012 | Myr | G08G 1/202 | 705/7.13 |
| 2013/0046841 A1* | 2/2013 | Park | H04W 4/08 | 709/206 |
| 2013/0066984 A1* | 3/2013 | Shin | H04L 12/1854 | 709/206 |
| 2013/0109425 A1* | 5/2013 | Kerger | H04L 65/4061 | 455/518 |
| 2013/0136049 A1* | 5/2013 | Song | H04W 76/40 | 370/312 |
| 2013/0229969 A1* | 9/2013 | Quan | H04L 12/189 | 370/312 |
| 2013/0246631 A1* | 9/2013 | Gonzales | H04N 21/6405 | 709/227 |
| 2013/0272186 A1* | 10/2013 | Mohanty | H04W 4/70 | 370/312 |
| 2014/0067826 A1* | 3/2014 | Jackson | G06Q 50/01 | 707/748 |
| 2014/0112251 A1* | 4/2014 | Kim | H04W 4/70 | 370/328 |
| 2014/0120973 A1* | 5/2014 | Agulnik | H04W 4/08 | 455/509 |
| 2014/0126452 A1* | 5/2014 | Agulnik | H04L 65/4061 | 370/312 |
| 2014/0192697 A1* | 7/2014 | Anchan | H04W 72/005 | 370/312 |
| 2014/0194100 A1* | 7/2014 | Anchan | H04W 4/06 | 455/416 |

(56) References Cited

U.S. PATENT DOCUMENTS

| | | | | |
|---|---|---|---|---|
| 2014/0219157 A1* | 8/2014 | Sukumar | H04W 4/06 | 370/312 |
| 2014/0282095 A1* | 9/2014 | Walters | H04L 65/403 | 715/753 |
| 2014/0286222 A1* | 9/2014 | Yu | H04W 4/08 | 370/312 |
| 2014/0304357 A1* | 10/2014 | Bestler | H04L 67/1097 | 709/213 |
| 2014/0355508 A1* | 12/2014 | Anchan | H04W 4/10 | 370/312 |
| 2014/0357226 A1* | 12/2014 | Charugundla | H04W 4/023 | 455/411 |
| 2014/0358997 A1* | 12/2014 | Boulkenafed | H04L 12/18 | 709/203 |
| 2015/0063186 A1* | 3/2015 | Kakadia | H04W 4/06 | 370/312 |
| 2015/0223028 A1* | 8/2015 | Wang | H04W 4/70 | 370/312 |
| 2015/0223030 A1* | 8/2015 | Gu | H04W 4/08 | 370/312 |
| 2015/0229677 A1* | 8/2015 | Gu | H04L 65/103 | 709/219 |
| 2015/0230063 A1* | 8/2015 | Chandramouli | H04W 4/70 | 455/466 |
| 2015/0236865 A1* | 8/2015 | Field | H04L 12/185 | 370/390 |
| 2015/0244656 A1* | 8/2015 | Choi | H04N 21/4788 | 709/206 |
| 2015/0317583 A1* | 11/2015 | Huang | H04N 21/2393 | 705/7.22 |
| 2016/0036962 A1* | 2/2016 | Rand | H04R 1/1041 | 455/418 |
| 2016/0165413 A1* | 6/2016 | Bhalla | H04W 4/08 | 455/456.5 |

OTHER PUBLICATIONS

Wikipedia, "Multimedia Broadcast Multicast Service", http://en.wikipedia.org/w/index.php?title=Multimedia_Broadcast_Mulicast_Service&oldid=56433570, Jul. 15, 2013, 4 pages.

* cited by examiner

| Group ID 535 | Group Name 540 | Group Members 545 |
|---|---|---|
| 001 | Baltimore Taxi Cabs | Taxi-328, Taxi-106, Taxi-839, Taxi-390 |
| 002 | Gerald's Painting Group | G. Davis, K. Hitchens, A. Rusko |

500

| Member ID 550 | Member Name 555 | IP Address 560 |
|---|---|---|
| Taxi-328 | Joseph Hunt | 63.24.2.196 |
| Taxi-106 | Cynthia Thomas | 41.32.8.457 |
| Taxi-839 | Gustav Roman | 95.14.2.852 |
| Taxi-390 | Traci Dunn | 72.74.6.276 |

FIG. 5B

PRIVATE MULTICAST NETWORKS

BACKGROUND

Communication devices, such as cellular telephones, smartphones, computers, or the like, may receive information from other communication devices via a network. The information may be transmitted via evolved multimedia broadcast multicast services ("eMBMS") to the communication devices.

BRIEF DESCRIPTION OF THE DRAWINGS

FIGS. 5A-5C are diagrams of example data structures that store information associated with a set of private wireless networks;

DETAILED DESCRIPTION OF PREFERRED EMBODIMENTS

The following detailed description of example implementations refers to the accompanying drawings. The same reference numbers in different drawings may identify the same or similar elements.

A user of a user device (e.g., a cellular phone, a smartphone, a computing device, etc.) may communicate with other users of other user devices as members of a group (e.g., a social network, a professional network, etc.). The user devices may communicate via a multicast network by use of evolved multimedia broadcast multicast services ("eMBMS"). Use of an eMBMS network may allow for a message sent from one user device to be broadcast to other user devices associated with the group (e.g., via a multicast broadcast). Additionally, use of an eMBMS network may allow for reduced latency associated with a message sent between the user devices, as a network may use eMBMS to deliver the message to members of the group without having to send the message to a server device. However, the users may wish to determine the groups (e.g., what user devices are associated with the group), to join the group, and may wish to log into the group and/or log out of the group. Implementations described herein may allow a provisioning device to create a private wireless network of user devices whereby the user devices may log in to a group, and may receive multicast messages from other members of the group.

Figure 1:
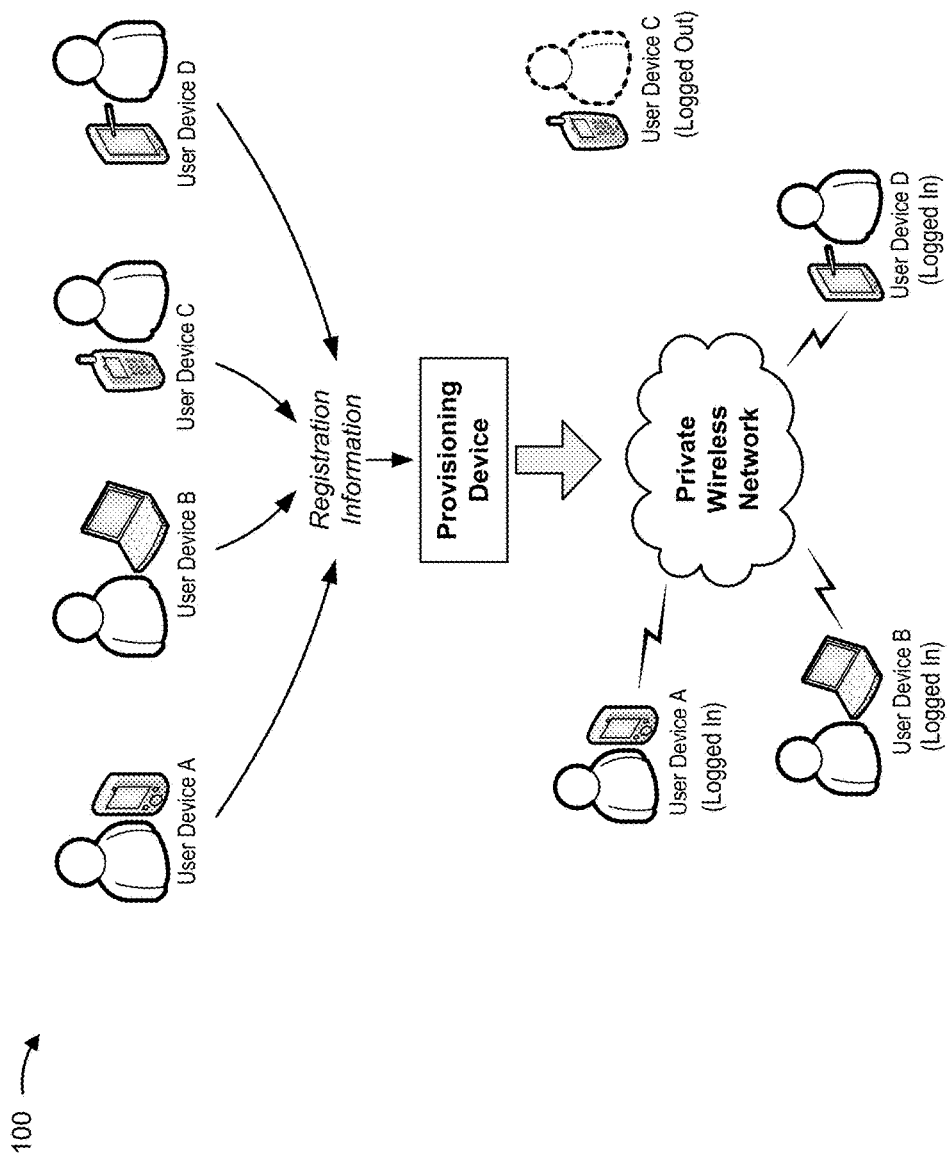
FIG. 1 is a diagram of an overview of an example implementation described herein.

FIG. 1 is a diagram of an overview of an example implementation 100 described herein. As shown in FIG. 1, example implementation may include a set of users, a set of user devices associated with the set of users, and a provisioning device.

As shown in FIG. 1, the set of users may provide registration information to the provisioning device via the set of user devices. The registration information may include information for registering the set of users as members of a group. The group may include an association of one or more user devices. Based on the registration information, the provisioning device may create the group. Based on information associated with the user devices, (e.g., log on information), the provisioning device may determine which members of the group are active (e.g., are logged into the group).

Based on the association between the group and the set of user devices, the provisioning device may provision a private wireless network for the group. The private wireless network may include a multicast network that allows a message sent from a first user device (e.g., user device A) to be broadcast to the other active user devices associated with the group (e.g., user device B and user device D). The provisioning device may provision the private wireless network so that an inactive member of the group does not receive the message (e.g., user device C). In this manner, the provisioning device may determine a private wireless network of user devices that may be always active (e.g., similar to a push to talk network), and that may be scaled as group membership increases.

Figure 2:
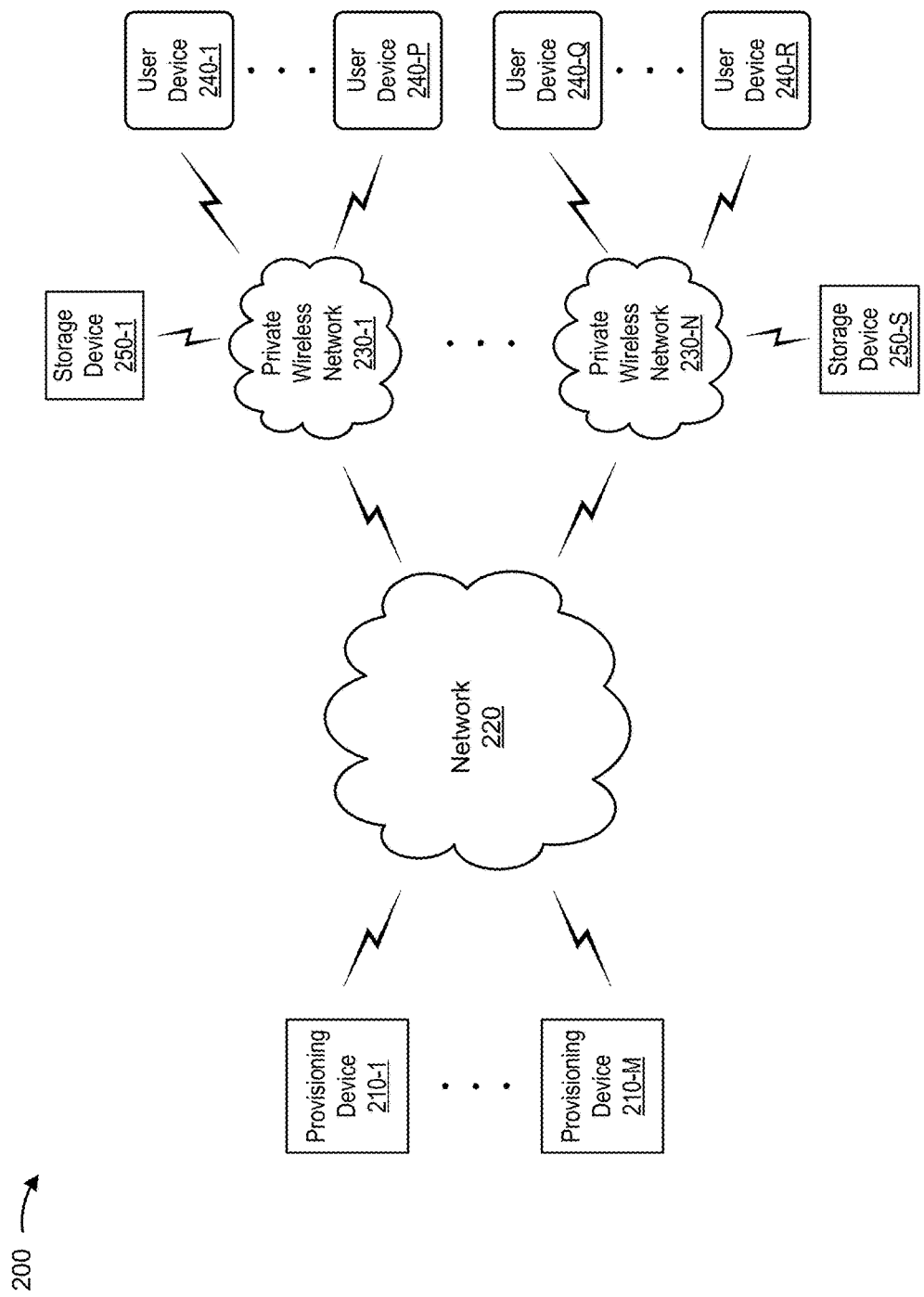
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include provisioning devices 210-1 . . . 210-M (M≥1) (hereinafter referred to collectively as "provisioning devices 210," and individually as "provisioning device 210"), a network 220, private wireless networks 230-1 . . . 230-N (N≥1) (hereinafter referred to collectively as "private wireless networks 230," and individually as "private wireless network 230"), user devices 240-1 . . . 210-R (R≥1) (hereinafter referred to collectively as "user devices 240," and individually as "user device 240"), and storage devices 250-1 . . . 250-S (S≥1) (hereinafter referred to collectively as "storage devices 250," and individually as "storage device 250"). Devices of environment 200 may interconnect via wired connections, wireless connections, or a combination of wired and wireless connections.

Provisioning device 210 may include a device capable of provisioning a multicast group. For example, provisioning device 210 may include a computing device (e.g., a desktop computer, a laptop computer, a tablet computer, a handheld computer, etc.), a network device (e.g., a gateway, a base station, etc.), a server, or a similar device. Provisioning device 210 may receive information from and/or transmit information to user device 240 and/or storage device 250.

Network 220 may include one or more wired and/or wireless networks. For example, network 220 may include a cellular network, a long term evolution ("LTE") network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Private wireless network 230 may include one or more wireless networks. For example, private wireless network may include a cellular network a long term evolution ("LTE") network, a multimedia broadcast multicast services ("MBMS") network, an evolved multimedia broadcast multicast services ("eMBMS") network, and/or a combination of these or other types of wireless networks. In some implementations, private wireless network 230 may be a subset of and/or share resources with network 220.

User device 240 may include a device capable of receiving and/or transmitting information, such as information associated with voice calls, video calls, emails, SMS text messages, or the like. For example, user device 210 may include a mobile telephone (e.g., a smartphone, a radiotelephone, etc.), a computing device (e.g., a desktop computer, a laptop computer, a tablet computer, a handheld computer, etc.), or a similar device. User device 240 may receive information from and/or transmit information to provisioning device 210 and/or storage device 250.

Storage device 250 may include one or more devices capable of receiving, storing, processing, and/or transmitting information, such as information transmitted between user devices 240. For example, storage device 250 may include a computing device, such as a server, a desktop computer, a laptop computer, a tablet computer, a handheld computer, or a similar device. Storage device 250 may receive information from and/or transmit information to provisioning device 210 and/or user device 240.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
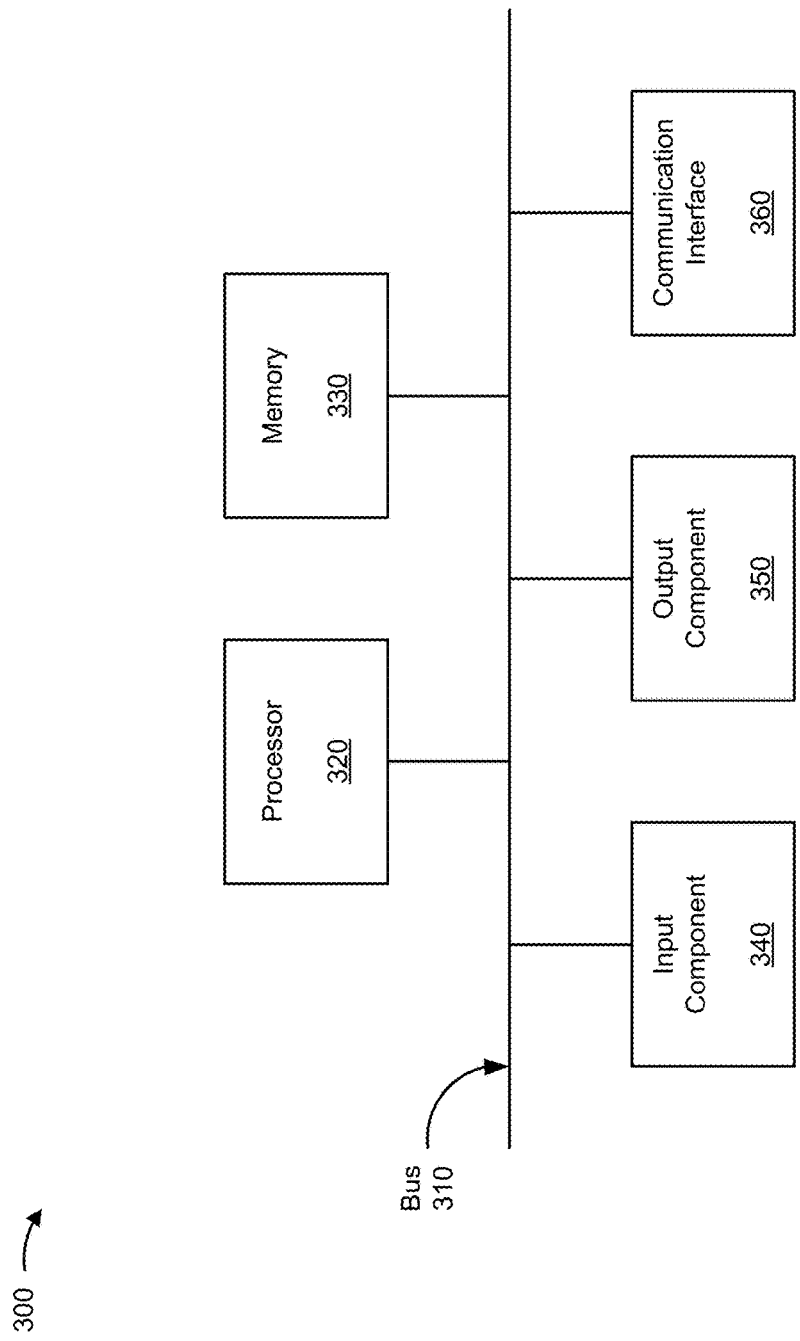
FIG. 3 is a diagram of example components of one or more devices of FIG. 2.

FIG. 3 is a diagram of example components of a device 300. Device 300 may correspond to provisioning device 210, user device 240, and/or storage device 250. Additionally, or alternatively, each of provisioning device 210, user device 240, and/or storage device 250 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
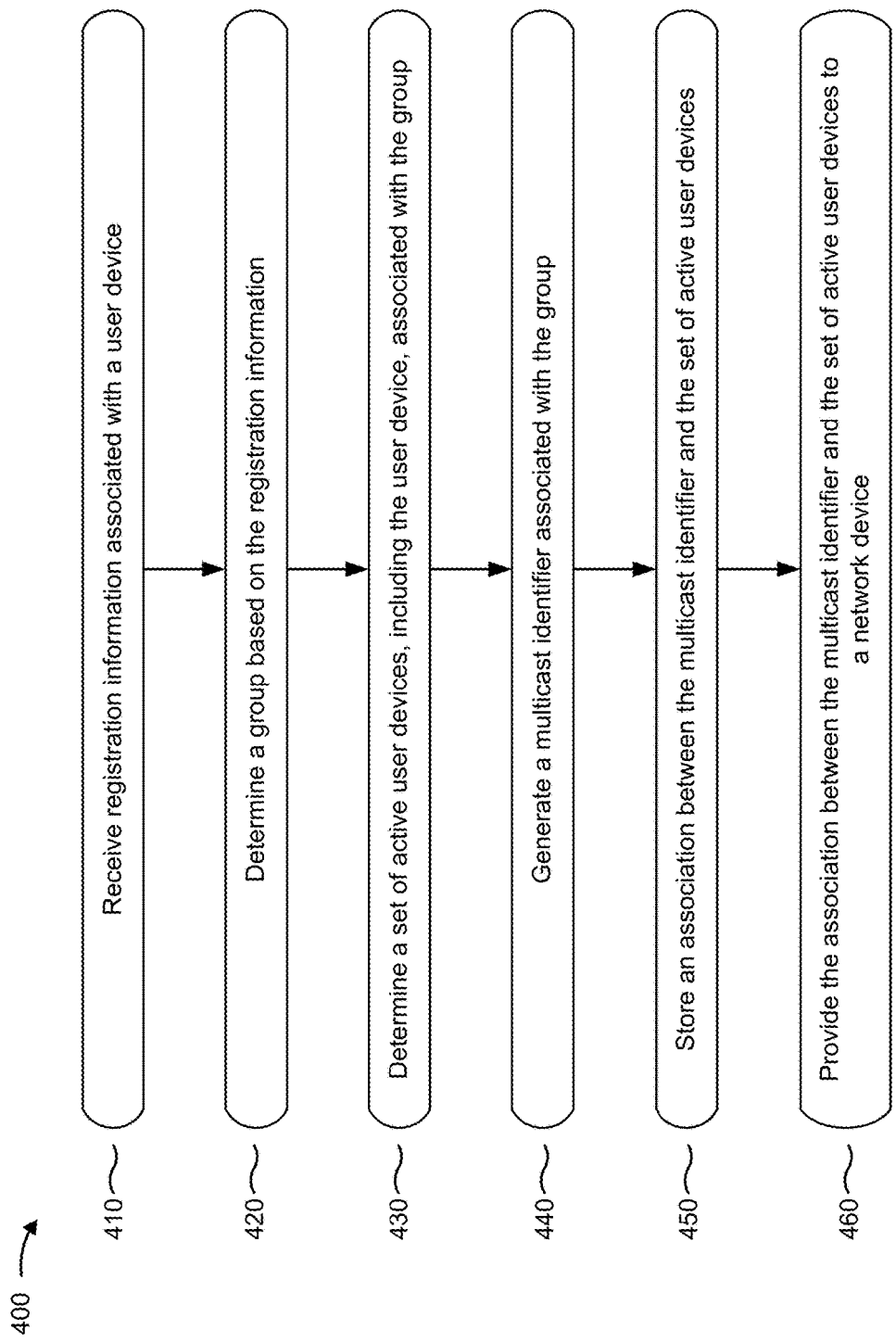
FIG. 4 is a flow chart of an example process for provisioning a private wireless network.

FIG. 4 is a flow chart of an example process 400 for provisioning a private wireless network. In some implementations, one or more process blocks of FIG. 4 may be performed by provisioning device 210. Additionally, or alternatively, one or more process blocks of FIG. 4 may be performed by another device or a group of devices separate from or including provisioning device 210, such as user device 240 and/or storage device 250.

As shown in FIG. 4, process 400 may include receiving registration information associated with a user device (block 410). For example, provisioning device 210 may receive the registration information associated with user device 240. The registration information may include information for registering user device 240 and/or a user associated with user device 240 as a member of a group.

In some implementations, the registration information may include information associated with user device 240. For example, the registration information may include information that identifies user device 240, such as a serial number, an identification number ("ID"), a phone number, an internet protocol ("IP") address, or the like. Additionally, or alternatively, the registration information may include a device type (e.g., whether user device 240 is a smartphone, a computing device, a tablet device, etc.), a device model, a location of user device 240, or the like.

In some implementations, the registration information may include user information associated with a user of user device 240. For example, the registration information may include a name of the user, an address of the user, a phone number associated with the user, or the like. In some implementations, the registration information may include demographic information associated with the user (e.g., an age of the user, a gender of the user, etc.). Additionally, or alternatively, the registration information may include information for logging into an account associated with user device 240 (e.g., a username, a password, a personal identification number, etc.).

In some implementations, the registration information may include user preference information. For example, the registration information may include information that identifies a group that user device 240 and/or the user is to be associated with, one or more other group members (e.g., other user devices 240, other users of user devices 240, etc.), or the like. Additionally, or alternatively, the registration information may include information that describes the group, such as a group name, a group ID, a group description, or the like.

In some implementations, the registration information may designate user device 250 and/or the user as a member of a preexisting group (e.g., a group previously created by another user device 240). Additionally, or alternatively, the registration information may include information for creating a new group associated with user device 240 and/or the user.

In some implementations, provisioning device 210 may receive the registration information from user device 240. For example, user device 240 may receive the registration information from a user of user device 240 (e.g., via user input), and may provide the registration information to provisioning device 210. Additionally, or alternatively, provisioning device 210 may receive the registration information from another device, such as an account server associated with a service provider associated with user device 240 (e.g., a home subscriber server), storage device 250, or the like.

As further shown in FIG. 4, process 400 may include determining a group based on the registration information (block 420). For example, provisioning device 210 may determine the group based on the registration information received from user device 240.

In some implementations, the group may include an association of one or more user devices 240 and/or one or more users of user devices 240. For example, the group may include user devices 240 associated as members of a wireless network (e.g., private wireless network 230). In some implementations, provisioning device 210 may determine group information (e.g., information that describes the group), and may store the group information in a data structure associated with provisioning device 210. Additionally, or alternatively, provisioning device 210 may provide the group information to another device, such as user device 240, and/or storage device 250.

In some implementations, provisioning device 210 may determine the group based on the registration information provided by user device 240. For example, provisioning device 210 may determine which user devices 240 to include as members of the group based on a preference of a user of user device 240 (e.g., a preference to be a part of the group, a preference to be grouped with other user devices 240 and/or other users of user devices 240, etc.). Additionally, or alternatively, provisioning device 210 may determine the group based on a location of user device 240, a device type of user device 240, a business rule, or the like.

In some implementations, provisioning device 210 may determine that storage device 250 is to be a member of the group. For example, provisioning device 210 may determine that storage device 250 is to be a member of the group so as to receive a message sent from user devices 240. In some implementations, storage device 250 may store the messages in a data structure associated with storage device 250 to maintain a record of the messages.

In some implementations, provisioning device 210 may determine a group identifier associated with the group. For example, the group identifier may include a group name, a group number, a group ID (e.g., a unique set of characters), or the like. Additionally, or alternatively, provisioning device 210 may determine a member identifier associated with a member of the group (e.g., user device 240, a user of user device 240, etc.). For example, the member identifier may include a set of characters (e.g., numbers, letters, symbols, etc.) that identify the user, such as a name, an ID number, a username, or the like. Additionally, or alternatively, the member identifier may include a set of characters that identify user device 240, such as a serial number, a device name, an IP address associated with user device 240, or the like.

In some implementations, provisioning device 240 may automatically determine group information associated with the group. For example, provisioning device 210 may determine and/or assign a group ID, a group name, a group number, an IP address, or the like. Additionally, or alternatively, provisioning device 240 may determine the group information based on the registration information (e.g., based on the preferences of a user of user device 240).

In some implementations, a set of provisioning devices 210 may store information associated with user devices 240 (e.g., group information, registration information, etc.). For example, a first provisioning device 210-1 may be associated with a first set of user devices 240, and may store information associated with the first set of user devices 240 (e.g., groups associated with the first set of user devices 240, device information associated with the first set of user devices 240, user information associated with users of the first set of user devices 240, etc.). A second provisioning device 210-2 may be associated with a second set of user devices 240, and may store information associated with the second set of user devices 240 (e.g., groups associated with the second set of user devices 240, device information associated with the second set of user devices 240, user information associated with users of the second set of user devices 240, etc.). First provisioning device 210-1 may receive a request from a user device 240 of the second set of user devices 240 (a request to log into an account, a request to register as a member of a group, etc.). Based on the request, first provisioning device 210-1 may receive information from and/or transmit information to second provisioning device 210-2. For example, first provisioning device 210-1 may provide registration information, received from user device 240, to second provisioning device 210-2 to allow user device 240 to join a group associated with provisioning device 210-2.

In some implementations, provisioning device 210 may be associated with a geographic region, and may send queries from user devices 240 outside of the geographic region to another provisioning device 210 (e.g., associated with another geographic region). In some implementations, a set of provisioning devices 210 may be associated with a virtual IP address (e.g., an IP address associated with multiple provisioning devices 240). For example, a centralized provisioning device 210 may forward requests (e.g., sent from user devices 240 to the virtual IP address) to an appropriate provisioning device 210, of the set of provisioning devices 210. In this manner, centralized provisioning device 210 may act as a load balancer.

As further shown in FIG. 4, process 400 may include determining a set of active user devices, including the user device, associated with the group (block 430). For example, provisioning device 210 may determine a set of active user devices 240, of a set of user devices 240 associated with the group, that are currently active. In some implementations, active member devices 240 may include group members (e.g., user devices 240) currently connected via a wireless network (e.g., private wireless network 230).

In some implementations, provisioning device 210 may determine active user devices based on user input. For example, a user of user device 240 may be a member of a group. The user may provide user input (e.g., via user device 240) indicating that the user is active (e.g., that the user would like to send information to other members of the group and/or receive information from the other members of the group). In some implementations, provisioning device 210 may receive login information from user device 240 (e.g., a username, a password, etc.). Based on the login information (e.g., based on the user logging into the group), provisioning device 210 may determine that user device 240 is an active user device 240.

In some implementations, provisioning device 210 may determine active user devices 240 based on one or more attributes of user device 240. For example, provisioning device 210 may determine that user device 240 is an active user device 240 based on a location of user device 240, a status of user device 240 (e.g., that user device 240 is powered on, that user device 240 is connected to a network, etc.), a type of user device 240, or the like.

In some implementations, provisioning device 210 may determine a set of IP addresses associated with active user devices 240. For example, provisioning device 210 may determine an IP address associated with user device 240 when a user of user device 240 logs into the group.

In some implementations, provisioning device 210 may determine that storage device 250 is an active member of the group. Additionally, or alternatively, provisioning device 210 may determine an IP address associated with storage device 250, an identifier associated with storage device 250, or the like.

In some implementations, provisioning device 210 may store information associated with active user devices 240 in a data structure associated with provisioning device 210 (e.g., a list of active user devices 240, a set of IP addresses associated with active user devices 240, a storage device 250 that is an active member of the group, etc.). Additionally, or alternatively, provisioning device 210 may provide the information to another device, such as another provisioning device 210, user device 240 and/or storage device 250.

As further shown in FIG. 4, process 400 may include generating a multicast identifier associated with the group (block 440). For example, provisioning device 210 may determine a multicast identifier to be associated with the group of active user devices 240.

In some implementations, the multicast identifier may include an identifier that allows a message to be sent from a first use device 240-1 to other user devices 240 (e.g., actively associated with the group). The message may include information sent and/or received by user device 240, such as a voice call, a video call, an email, a video, a file, a short message service ("SMS") text message, or the like.

In some implementations, the multicast identifier may include a multicast address. The multicast address may allow one or more network devices (e.g., a router, an eNB, a switch, a gateway, etc.) to deliver the message to active user devices 240 via a wireless network (e.g., private wireless network 230). In some implementations, the multicast address may allow the message to be delivered by use of multimedia broadcast multicast services ("MBMS"), evolved multimedia broadcast multicast services ("eM-BMS"), or the like.

In some implementations, provisioning device 210 may generate a socket, associated with user device 240 and/or private wireless network 230, for user device 240 to receive and/or send messages. For example, the socket may include a communication endpoint in a network (e.g., network 220, private wireless network 230, etc.). In some implementations, the socket may be associated with a socket address. For example, the socket address may include a combination of an IP address and a port number. In some implementations, provisioning device 210 may generate the socket by use of an application programming interface ("API") associated with user device 240 (e.g., a socket API).

As further shown in FIG. 4, process 400 may include storing an association between the multicast identifier and the set of active user devices (block 450). For example, provisioning device 210 may store the association between the multicast identifier and active user devices 240 in a data structure associated with provisioning device 210. Additionally, or alternatively, another device may store the association between the multicast identifier and the set of active user devices (e.g., in a data structure associated with the device), such as user device 240 and/or storage device 250.

In some implementations, provisioning device 210 may store an association between a multicast address association with the group and a set of IP addresses associated with active user devices 240. For example, provisioning device 210 may determine an active member of the group (e.g., a member of the group who is logged into an account associated with the group). Provisioning device 210 may determine an active user device 240, of a set of user devices 240, associated with the active member. Provisioning device 210 may determine an IP address associated with active user device 240, and may store an association between the IP address and the multicast address.

In some implementations, provisioning device 210 may determine an association between a first multicast identifier (e.g., associated with a first group) and a second multicast identifier (e.g., associated with a second group). Provisioning device 210 may store the association (e.g., in a data structure) to allow the first and second groups to be associated. For example, provisioning device 210 may associate the first and second groups to permit the first group to merge with the second group, to permit the first group to become a subgroup of the second group, to scale the first and second groups (e.g., to generate a larger group), or the like.

As further shown in FIG. 4, process 400 may include providing the association between the multicast identifier and the set of active user devices to a network device (block 460). For example, provisioning device 210 may determine association information associated with active user devices 240 and the group. The association information may include information that identifies the association between the multicast identifier and active user devices 240. Provisioning device 210 may provide the association information to a network device (e.g., associated with private wireless network 230).

In some implementations, provisioning device 210 may provide the association information to a network device (e.g., a router, an eNB, a switch, a gateway, etc.) to cause the network device to deliver a message, sent from a first active user device 240-1, to a remaining set of active user devices 240 (e.g., other active user devices 240, besides first active user device 240, associated with the group). Additionally, or alternatively, provisioning device 210 may provide the association to another provisioning device (e.g., a regional provisioning device 210, a centralized provisioning device 210, etc.).

In some implementations, provisioning device 210 may provide the association information periodically. For example, provisioning device 210 may provide the association information when user device 240 has joined the group (e.g., become associated with the group), when user device 240 has left the group (e.g., become disassociated with the group), when user device 240 has become active (e.g., logged into an account), when active user device 240 has become inactive (e.g., logged out of the account), or the like.

In some implementations, the network device may deliver the message by use of a routing protocol. For example, the network device may deliver the message via a distance-vector routing protocol (DVRP), a link-state routing protocol, or the like. Additionally, or alternatively, the network device may deliver the message by use of a protocol-independent multicast ("PIM") protocol, such as PIM sparse mode ("PIM-SM"), PIM dense mode ("PIM-DM"), bidirectional PIM, PIM source-specific multicast (PIM-SSM"), or the like.

In some implementations, the network device may deliver the message to storage device 250. For example, storage device 250 may be a member of a group. The network device may deliver messages sent from members of the group (e.g., active user devices 240) to storage device 250. In some implementations, storage device 250 may store the messages as a history of messages (e.g., in a data structure associated with storage device 250). Additionally, or alternatively, storage device 250 may provide the history of messages to another device, such as provisioning device 210 and/or user device 240.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5A:
Figure 5C:

FIGS. 5A-5C are diagrams of example data structures that store information associated with a set of private wireless networks. Data structure 500, data structure 510, and/or data structure 520 may be stored in a memory device (e.g., a RAM, a hard disk, etc.), associated with one or more devices and/or components shown in FIGS. 2 and 3. For example, data structure 500, data structure 510, and/or data structure 520 may be stored by provisioning device 210.

As shown in FIG. 5A, data structure 500 may include a collection of fields, such as a group ID field 535, a group name field 540, and a group members field 545.

Group ID field 535 may store information that identifies a group of users and/or a group of user devices 240. In some implementations, user devices 240 may be associated with a wireless network (e.g., private wireless network 230). In some implementations, the group ID may be expressed as a set of characters, including numbers, letters, and/or symbols. Provisioning device 210 may determine the group ID based on registration information received from user device 240 (e.g., when a user of user device 240 registered). Additionally, or alternatively, provisioning device 210 may determine the group ID automatically. For example, provisioning device 210 may determine the group ID based on a chronology of groups (e.g., based on which group, of a set of groups, was first created), based on a business rule, or the like.

Group name field 540 may store information that identifies and/or describes a name of the group identified in group ID field 535. In some implementations, the group name may be expressed as a set of characters, including numbers, letters, and/or symbols. Additionally, or alternatively, the group name may include an identifier to be used by members of the group (e.g., a colloquial name, a colloquial description, etc.). In some implementations, a member of the group (e.g., a user of user device 240) may determine the group name, and may provide the group name to provisioning device 210 (e.g., as part of the registration information). Additionally, or alternatively, provisioning device 210 may determine the group name automatically.

Group members field 545 may store information that identifies members of the group identified in group ID field 535. Group members field 545 may include one or more member identifiers that include one or more characters (e.g., numbers, letters, symbols, etc.) that identify the set of members associated with the group (e.g., the set of users, the set of user devices 240, etc.). In some implementations, the member identifier may include a user name, a user ID, a device name, a device ID, a device type, or the like. Provisioning device 210 may determine the members associated with the group based on registration information. For example, a user of user device 240 may select a group identified in group ID field 535 and/or group name field 540, and provisioning device may add the user to the group by adding an identifier to group members field 545.

Information associated with a single group ID may be conceptually represented as a row in data structure 500. For example, the first row in data structure 500 may correspond to a particular group identified with group ID of "001." Provisioning device 210 may determine the group ID chronologically (e.g., based on the group being the first group created by provisioning device 210). Additionally, or alternatively, provisioning device 210 may determine the group ID based on a user preference, a business rule, or the like. The group ID may correspond to a group of taxicab drivers, which are identified by a group name of "Baltimore Taxi Cabs." Provisioning device 210 may determine the group name based on a user preference (e.g., based on the registration information provided by a user). The group of taxicab drivers may include members of the group, identified by member IDs "Taxi-328," "Taxi-106," "Taxi-839," and "Taxi-390." A member ID may include an identifier associated with a particular taxi cab and/or taxi cab driver (e.g., a particular user).

The second row in data structure 500 of FIG. 5A may correspond to a particular group identified with a group ID of "002." This particular group may be associated with a painting group, and may be identified with a group name of "Gerald's Painting Group." The group may be associated with a set of group members identified by member IDs "G. Davis," "K. Hitchens," and "A. Rusko." The member IDs may include a first initial and last name of the group members. Provisioning device 210 may determine the member ID based on registration information provided by the members.

As shown in FIG. 5B, data structure 510 may include a collection of fields, such as a member ID field 550, a member name field 555, and an IP address field 560.

Member ID field 550 may store information that identifies a member of a group (e.g., a group identified in group ID field 535 (FIG. 5A)). In some implementations, the member ID may identify a user of user device 240 that is a member of the group. Additionally, or alternatively, the member ID may identify a particular user device 240 associated with the user. Provisioning device 210 may determine the member ID based on registration information provided by the member. Additionally, or alternatively, provisioning device 210 may determine the member ID automatically.

Member name field 555 may store information that identifies a name of a member associated with the group ID. The member name may include a full name, a partial name (e.g., a first name, a last name, an initial, etc.), a nickname, or the like. Provisioning device 210 may determine the member name based on registration information provided by the member (e.g., a user of user device 240).

IP address field 560 may store information that identifies an IP address associated with a user device 240 associated with a member identified by the member ID and/or the member name. In some implementations, the IP address may include a numerical label assigned to a device (e.g., user device 240) to allow the device to receive and/or transmit information via a network (e.g., network 220, private wireless network 230, etc.). Provisioning device 210 may determine the IP address based on registration information. Additionally, or alternatively, provisioning device 210 may determine the IP address when a user (e.g., via user device 240) logs into an account associated with the group.

Information associated with a single member of a group may be conceptually represented as row in data structure 510. For example, the first row in data structure 510 may correspond to a first taxi cab driver associated with a group of Baltimore taxi cab drivers (e.g., identified as group ID "001" in FIG. 5A). The first taxi cab driver may be associated with a member ID of "Taxi-328," and a name of "Joseph Hunt." The member ID may be associated with the group of taxi cab drivers, and may be stored in group members field 545 (e.g., FIG. 5A). The member ID may be associated with an IP address of "63.24.2.196," that identifies a particular user device 240 associated with the first taxi cab driver.

The second row of data structure 510 may correspond to a second taxi cab driver associated with the group. The second taxi cab driver may be identified by a member ID of "Taxi-106," a member name of "Cynthia Thomas," and may be associated with a particular user device 240 identified by an IP address of "41.32.8.457." Likewise, the third row of data structure 510 may correspond to a third taxi cab driver (e.g., with member ID "Taxi-839," member name "Gustav Roman," and IP address "95.14.2.852"), and the fourth row of data structure 510 may correspond to a fourth taxi cab driver (e.g., with member ID "Taxi-390," member name "Traci Dunn," and IP address "72.74.6.276.")

As shown in FIG. 5C, data structure 520 may include a collection of fields, such as a group ID field 565, a group name field 570, a multicast address field 575, and an active group members field 580.

Group ID field 565 may store information that identifies a group of users and/or a group of user devices 240. Provisioning device 210 may determine group ID field 565 based on group ID field 535 (e.g., FIG. 5A). Group name field 570 may store information that identifies and/or describes a name of the group identified in group ID field 565. Provisioning device 210 may determine group name field 570 based on group name field 540 (e.g., FIG. 5A).

Multicast address field 575 may store information that identifies an identifier that allows one or more network devices (e.g., a router, an eNB, a gateway device, etc.) to deliver a message to user devices 240 via a wireless network (e.g., private network 230). The multicast address may include a unique set of numbers, letters, and/or symbols. Provisioning device 210 may determine the multicast address, and may assign the multicast address to the group identified by the group ID.

Active group members field 580 may store information that identifies which members of the group identified by group ID field 565 are currently active (e.g., logged into the group). The active group members may include one or more member IDs of the set of member IDs identified in group members field 545 (e.g., FIG. 5A). In some implementations, provisioning device 210 may determine the set of active group members based on user input (e.g., based on login information). For example, when a member logs into the group, provisioning device 210 may add the member ID associated with the member to active group members field 580. Additionally, or alternatively, when the member logs out of the group, provisioning device 210 may remove the member ID from active group members field 580. In some implementations, provisioning device may determine that a member of the group is an active member by determining that a user device 240, associated with the member, is activated (e.g., that user device 240 is powered on, that an application associated with user device 240 has been opened, etc.).

Information associated with a group may be conceptually represented as a row in data structure 520. For example, a first row in data structure 520 may correspond to group ID "001." The group ID may identify a group of taxi cab drivers, with a group name of "Baltimore Taxi Cabs." Provisioning device 210 may assign a unique multicast address, "478.2.945," to the group, and may determine which members of the group are active group members (e.g., which members of the group are logged in to the group). The active group members may be identified by the member IDs "Taxi-328," "Taxi-839," and "Taxi-390." In some implementations, active group members field 580 may not include members of the group that are not active. For example, a group member (e.g., "Taxi-106") identified in group members field 545 (e.g., FIG. 5A) may not be included in the active members group if the member is logged out.

The second row in data structure 520 may correspond to group ID "002." The group ID may identify a social group of painters, with a group name of "Gerald's Painting Group." Provisioning device 210 may assign a unique multicast address, "532.2.741," to the group, and may determine that a single group member, with member ID "K. Hitchens," is currently active (e.g., currently logged on to the group).

In some implementations, provisioning device 210 may determine an association between active user devices 240 and the group by associating the multicast address (e.g., identified in multicast address field 575) with the set of IP addresses (e.g., identified in IP address field 560 of FIG. 5B) of user devices 240 associated with the active members (e.g., identified in active group members field 580). In this manner, active user device 240 may send a message to other active user devices 240, associated with a group, via a multicast broadcast.

Data structure 500, data structure 510, and data structure 520 include fields 535-580 for explanatory purposes. In practice, data structure 500, data structure 510, and/or data structure 520 may include additional fields, fewer fields, different fields, or differently arranged fields than those illustrated in FIGS. 5A-5C and/or described herein with respect to data structure 500, data structure 510, and/or data structure 520. Furthermore, while data structure 500, data structure 510, and data structure 520 are represented as tables with rows and columns, in practice, data structure 500, data structure 510, and/or data structure 520 may include any type of data structure, such as a linked list, a tree, a hash table, a database, or any other type of data structure. In some implementations, data structure 500, data structure 510, and/or data structure 520 may include information generated by a device and/or component. Additionally, or alternatively, data structure 500, data structure 510, and/or data structure 520 may include information provided from another source, such as information provided by a user, and/or information automatically provided by a device.

Figure 6A:
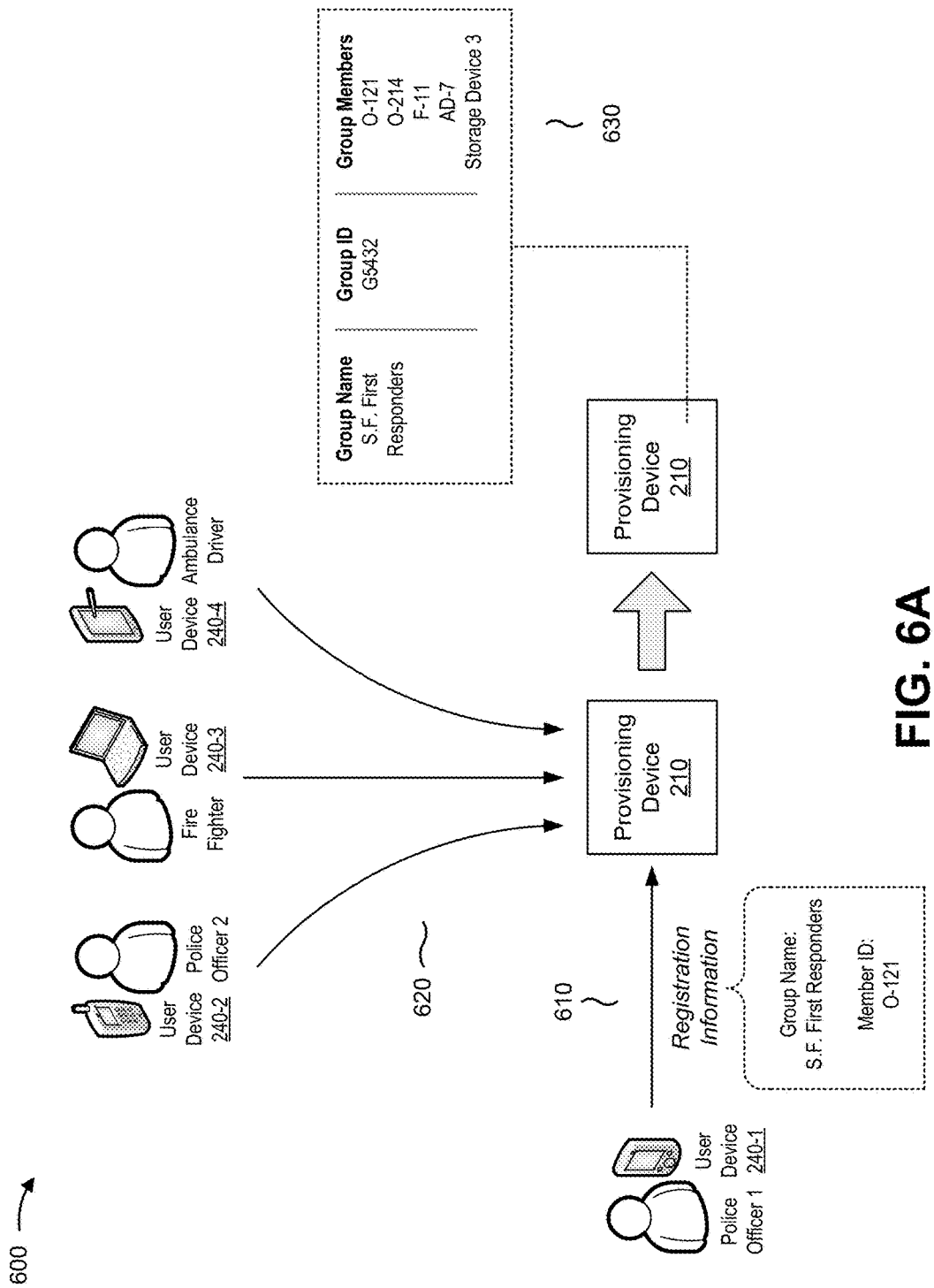
FIGS. 6A-6B are diagrams of an example implementation relating to the example process shown in FIG. 4.
Figure 6B:
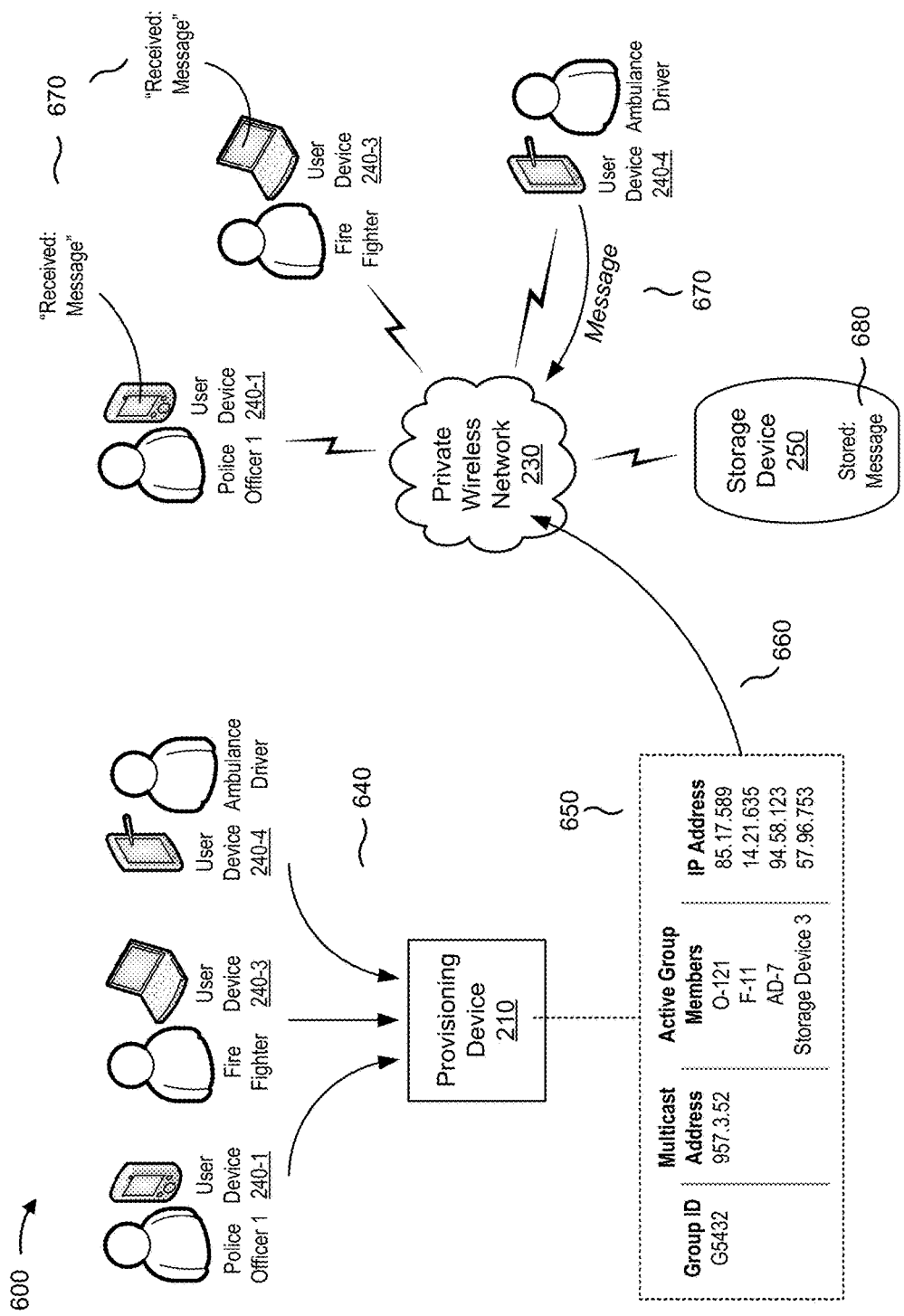

FIGS. 6A-6B are diagrams of an example implementation 600 relating to process 400 (FIG. 4). In example implementation 600, provisioning device 210 may create a wireless network of user devices 240 associated with first responders in a geographic region.

As shown by reference number 610, provisioning device 210 may receive registration information from a first user device 240-1. First user device 240-1 may be associated with a first police officer (e.g., "Police Officer 1"). The registration information may include information for creating a group of first responders in a city. The first police officer may specify, in the registration information, a group name (e.g., "S.F. First Responders"), a member ID (e.g., "O-121"), account information (e.g., a username, a password, etc.), or the like. Provisioning device 210 may create the group based on the registration information.

As shown in FIG. 6A, and by reference number 620, provisioning device 210 may receive registration information from a second user device 240-2 associated with a second police officer (e.g., "Police Officer 2"), a third user device 240-3 associated with a firefighter, and a fourth user device 240-4 associated with an ambulance driver. The registration information may include information that indicates that the second police officer, the firefighter, and the ambulance driver are to be members of the group of first responders (e.g., the group created based on the first police officer's registration information), and may include a set of member IDs (e.g., "O-214," "F-11," and "AD-7") associated with the second police office, the firefighter, and the ambulance driver, respectively. In some implementations, provisioning device 210 may determine a storage device (e.g., storage device 250), identified by member ID "Storage Device 3," to be a member of the group. Additionally, the registration information may include account information associated with the second police officer, the firefighter, and the ambulance driver (e.g., a set of usernames, a set of passwords, etc.).

As shown by reference number 630, provisioning device 210 may store information about the group (e.g., in a data structure associated with provisioning device 210). Provisioning device 210 may store the group name (e.g., "S.F. First Responders"), a group ID determined by provisioning device 210 (e.g., "G5432"), and a list of group members associated with the group (e.g., "O-121," "O-214," "F-11," "AD-7," and "Storage Device 3").

As shown in FIG. 6B, and by reference number 640, the first police officer (e.g., via first user device 240-1), the firefighter (e.g., via third user device 240-3), and the ambulance driver (e.g., via fourth user device 240-4) may log into the group. Based on the login information, provisioning device 240 may determine that first user device 240-1, third user device 240-3, and fourth user device 240-4 are active members of the group. Provisioning device 210 may determine a multicast address that identifies the group, and may determine a first IP address associated with first user device 240-1, a third IP address associated with third user device 240-3, and a fourth IP address associated with fourth user device 240-4. Provisioning device 210 may store information about the active group members, such as the group ID, the multicast address (e.g., "957.3.52"), member IDs associated with the active members of the group (e.g., "O-121," "F-11," and "AD-7"), and corresponding IP addresses (e.g., "85.17.589," "14.21.635," "94.58.123," and "57.96.753"), as shown by reference number 650.

As shown by reference number 660, provisioning device 210 may provide the information about the active group members (e.g., an association between the multicast address and the set of IP addresses associated with the group) to a network device (e.g., associated with private wireless network 230). As shown by reference number 670, the association may allow a message sent from fourth user device 240-4 to be delivered to the active members of the group (e.g., first user device 240-1 and third user device 230-3). The association may also allow the message to be delivered to storage device 250, as shown by reference number 680. Storage device 250 may store a history of messages sent from active user devices 240 (e.g., in a data structure associated with storage device 250).

As indicated above, FIGS. 6A-6B are provided merely as an example. Other examples are possible and may differ from what was described with regard to FIGS. 6A-6B.

Figure 7:
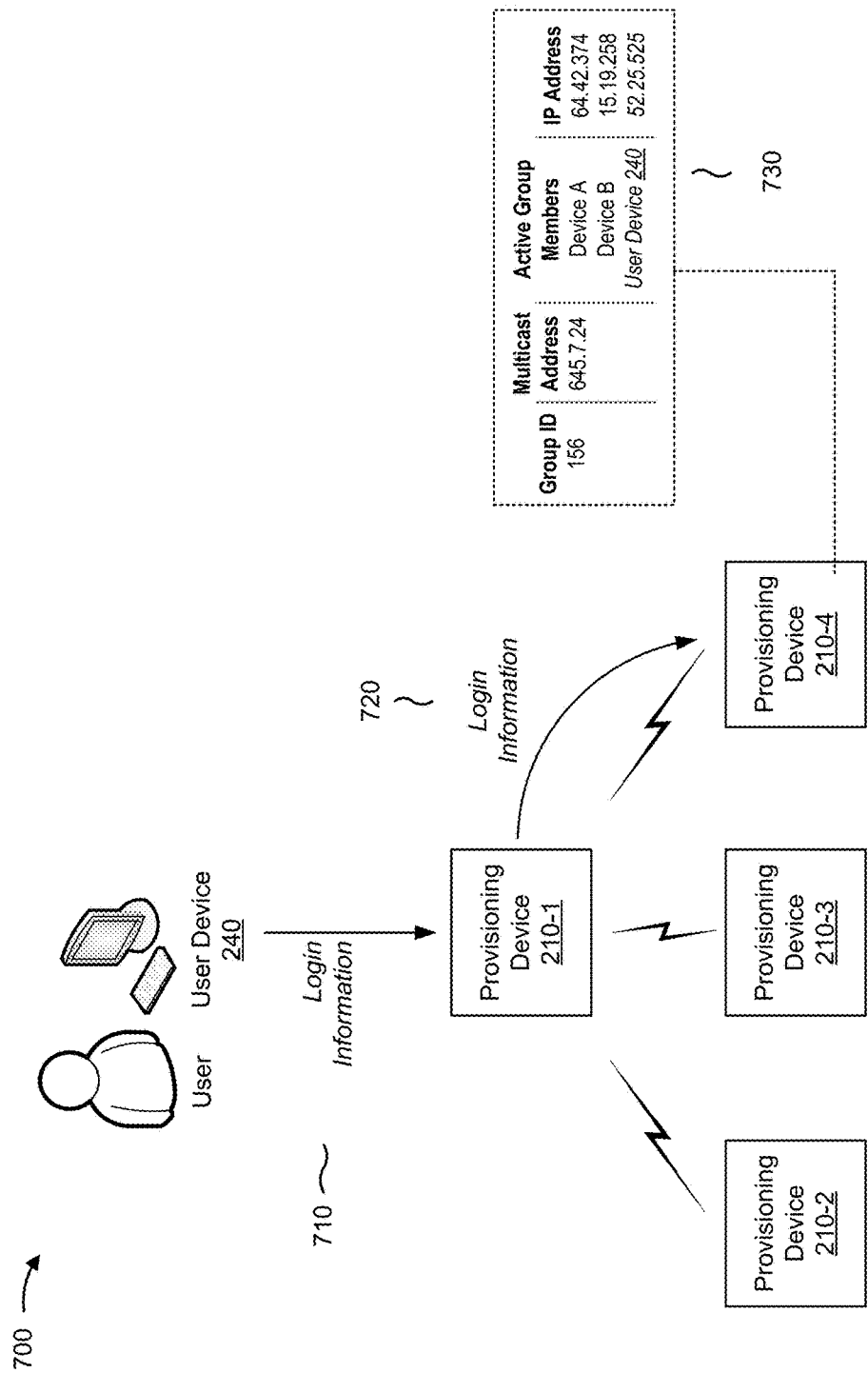
FIG. 7 is a diagram of another example implementation relating to the example process shown in FIG. 4.

FIG. 7 is a diagram of another example implementation 700 relating to process 400 (FIG. 4). In example implementation 700, a user device 240 may send login information to a first provisioning device 210-1, which may forward the login information to an appropriate provisioning device 210, of a set of provisioning devices (e.g., second provisioning device 210-2, third provisioning device 210-3, and fourth provisioning device 210-4).

As shown by reference number 710, user device 240 may provide login information to first provisioning device 210-1. First provisioning device 210-1 may act as a centralized provisioning device 210, and may store information that identifies which provisioning device 210, of the set of provisioning devices 210, stores information associated with a group to which user device 240 belongs. Based on determining an appropriate provisioning device 210, first provisioning device 210-1 may provide the login information to fourth provisioning device 210-4, as shown by reference number 720.

As shown by reference number 730, fourth provisioning device 210-4 may receive the login information from first provisioning device 210-1. Fourth provisioning device 210-4 may update group information associated with user device 240 based on the login information (e.g., may list user device 240 among a list of active user devices 240, may update an IP address associated with user device 240, or the like). Fourth provisioning device 210-4 may provide the group information to a network device associated with a wireless network (e.g., private wireless network 230) so that messages sent in the wireless network can be broadcast multicast to active user devices 240.

As indicated above, FIG. 7 is provided merely as an example. Other examples are possible and may differ from what was described with regard to FIG. 7.

Implementations described herein may allow a provisioning device to create a private, scalable wireless network of user devices that permit the user devices to receive multicast messages from other members of the group.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   a memory; and
   one or more processors to:
      receive registration information associated with a plurality of user devices,
         the registration information including:
            preference information that indicates a preference for a user device, of the plurality of user devices, to be part of a group or to be grouped with one or more other user devices of the plurality of the user devices;
      determine the group, based on the registration information, associated with the plurality of user devices;
      determine that a storage device, which stores a history of messages sent from a plurality of active user devices, is to be a member of the group,
         the storage device being separate from the device;
      generate a group identifier based on determining the group,
         the group identifier including an identifier to transport a message through a private wireless network;
      determine the plurality of active user devices, of the plurality of user devices, that are currently connected via the private wireless network,
         the group including the plurality of active user devices and one or more inactive user devices of the plurality of user devices;
      determine a plurality of device identifiers associated with the plurality of active user devices and the storage device;
      determine group information based on determining the plurality of device identifiers,
         the group information including an association between the group identifier and the plurality of device identifiers;
      provide the group information to a network device, associated with the private wireless network, to cause the network device to deliver the message from a first user device, of the plurality of active user devices, to one or more other active user devices of the plurality of active user devices and to the storage device without delivering the message to the one or more inactive user devices of the plurality of user devices; and
      receive the history of messages from the storage device after the message is delivered to the storage device.

2. The device of claim 1,
   where the one or more processors, when receiving registration information, are to:
      receive information indicating that a user device, of the plurality of user devices, is to be associated with a preexisting group; and
   where the one or more processors, when determining the group, are to:
      determine the preexisting group based on the information indicating that the user device is to be associated with the preexisting group.

3. The device of claim 1, where the one or more processors, when determining the plurality of active user devices, are to:
   determine an account associated with a user device of the plurality of user devices;
   determine that the user device is logged into the account; and
   determine that the user device is an active user device, of the plurality of active user devices, based on determining that the user device is logged into the account.

4. The device of claim 1,
   where the one or more processors, when determining the plurality of active user devices, are to:
      determine an account associated with a user device of the plurality of user devices;
      determine that the user device is logged out of the account; and
      determine the plurality of active user devices based on determining that the user device is logged out of the account; and
   where the one or more inactive user devices include the user device.

5. The device of claim 1, where the one or more processors, when providing the group information, are to:
   provide the group information to the network device to cause the network device to deliver the message to the storage device to permit the storage device to store the message with the history of messages.

6. The device of claim 1, where the one or more processors, when providing the group information, are to:
   receive updated group information; and
   provide the updated group information to the network device.

7. A non-transitory computer-readable medium storing instructions, the instructions comprising:
   one or more instructions that, when executed by one or more processors, cause the one or more processors to:
      receive registration information associated with a plurality of user devices, the registration information including preference information that indicates a preference for the user device to be part of a group or to be grouped with one or more other user devices of the plurality of the user devices;

determine the group, based on the registration information, associated with the plurality of user devices;

determine that a storage device, which stores a history of messages sent from a plurality of active user devices, is to be a member of the group,
the storage device being separate from the one or more processors;

determine a group identifier for the group;

determine the plurality of active user devices, of the plurality of user devices, that correspond to users that are currently connected via a private wireless network,
the group including the plurality of active user devices and one or more inactive user devices of the plurality of user devices;

determine a plurality of device identifiers associated with the plurality of active user devices and the storage device;

determine group information based on determining the plurality of device identifiers,
the group information including an association between the group identifier and the plurality of device identifiers;

provide the group information to a network device, associated with the private wireless network, to cause the network device to deliver a message from a first user device, of the plurality of active user devices, to one or more other active user devices of the plurality of active user devices and to the storage device without delivering the message to the one or more inactive user devices of the plurality of user devices; and receive the history of messages from the storage device after the message is delivered to the storage device.

8. The non-transitory computer-readable medium of claim 7,
where the one or more instructions, that cause the one or more processors to receive the registration information, cause the one or more processors to:
receive information indicating that a user device, of the plurality of user devices, is to be associated with a preexisting group; and
where the one or more instructions, that cause the one or more processors to determine the group, cause the one or more processors to:
determine the preexisting group.

9. The non-transitory computer-readable medium of claim 7,
where the group identifier is a multicast address; and
where the one or more instructions, that cause the one or more processors to provide the group information, cause the one or more processors to:
provide the group information to cause the network device to deliver the message using broadcast multicasting.

10. The non-transitory computer-readable medium of claim 7, where the plurality of device identifiers comprise a plurality internet protocol addresses.

11. The non-transitory computer-readable medium of claim 7,
where the one or more instructions further cause the one or more processors to:
determine group attribute information associated with the group,
the group attribute information including at least one of:
a group name associated with the group;
a group identification number associated with the group; or
a plurality of group members associated with the group; and
where the one or more instructions, that cause the one or more processors to determine the group information, cause the one or more processors to:
determine the group information based on the group attribute information.

12. The non-transitory computer-readable medium of claim 11,
where the plurality of group members is a first plurality of group members;
where the one or more instructions, that cause the one or more processors to determine the group attribute information associated with the group, cause the one or more processors to:
determine modified group attribute information associated with the group,
the modified group attribute information identifying at least one of:
a modified group name associated with the group;
a modified group identification number associated with the group; or
a second plurality of group members associated with the group; and
where the one or more instructions, that cause the one or more processors to determine the group information, cause the one or more processors to:
determine the group information based on the modified group attribute information.

13. The non-transitory computer-readable medium of claim 7, where the one or more instructions, that cause the one or more processors to provide the group information, cause the one or more processors to:
provide the group information to cause the network device to deliver the message using a multimedia broadcast multicast services network.

14. A method, comprising:
receiving, by a device, registration information associated with a plurality of user devices;
determining, by the device, a group, based on the registration information, associated with the plurality of user devices;
determine that a storage device, which stores a history of messages sent from a plurality of active user devices, is to be a member of the group,
the storage device being separate from the device;
determining, by the device, a multicast address based on determining the group;
determining, by the device, the plurality of active user devices, of the plurality of user devices, that are currently connected via a private wireless network,
the group including the plurality of active user devices and one or more inactive user devices of the plurality of user devices;
determining, by the device, a plurality of device identifiers associated with the plurality of active user devices and the storage device;
determining, by the device, group information based on determining the plurality of device identifiers, the group information including an association between the multicast address and the plurality of device identifiers;

providing, by the device, the group information to a network device, associated with the private wireless network, to cause the network device to deliver a message from a first user device, of the plurality of active user devices, to one or more other active user devices of the plurality of active user devices and to the storage device without delivering the message to the one or more inactive user devices of the plurality of user devices; and receiving, by the device, the history of messages from the storage device after the message is delivered to the storage device.

15. The method of claim 14, where determining the plurality of active user devices comprises:

determining the plurality of active user devices based on determining that the plurality of user devices are connected to a multicast broadcast network.

16. The method of claim 14, further comprising:

storing the group information in a data structure associated with the device.

17. The method of claim 14, further comprising:

receiving, by the device, updated registration information associated with a user device of the plurality of user devices;

determining a second device based on the updated registration information,
the second device being associated with the user device; and providing the updated registration information to the second device.

18. The method of claim 14, further comprising:

receiving updated group information; and providing the updated group information to the network device.

19. The method of claim 14, where determining the plurality of active user devices comprises:

determining an account associated with a user device of the plurality of user devices;

determining that the user device is logged into the account; and determining that the user device is an active user device based on determining that the user device is logged into the account.

20. The method of claim 14, where users, associated with the plurality of active user devices, share a type of occupation associated with the group.

* * * * *